2,422,279

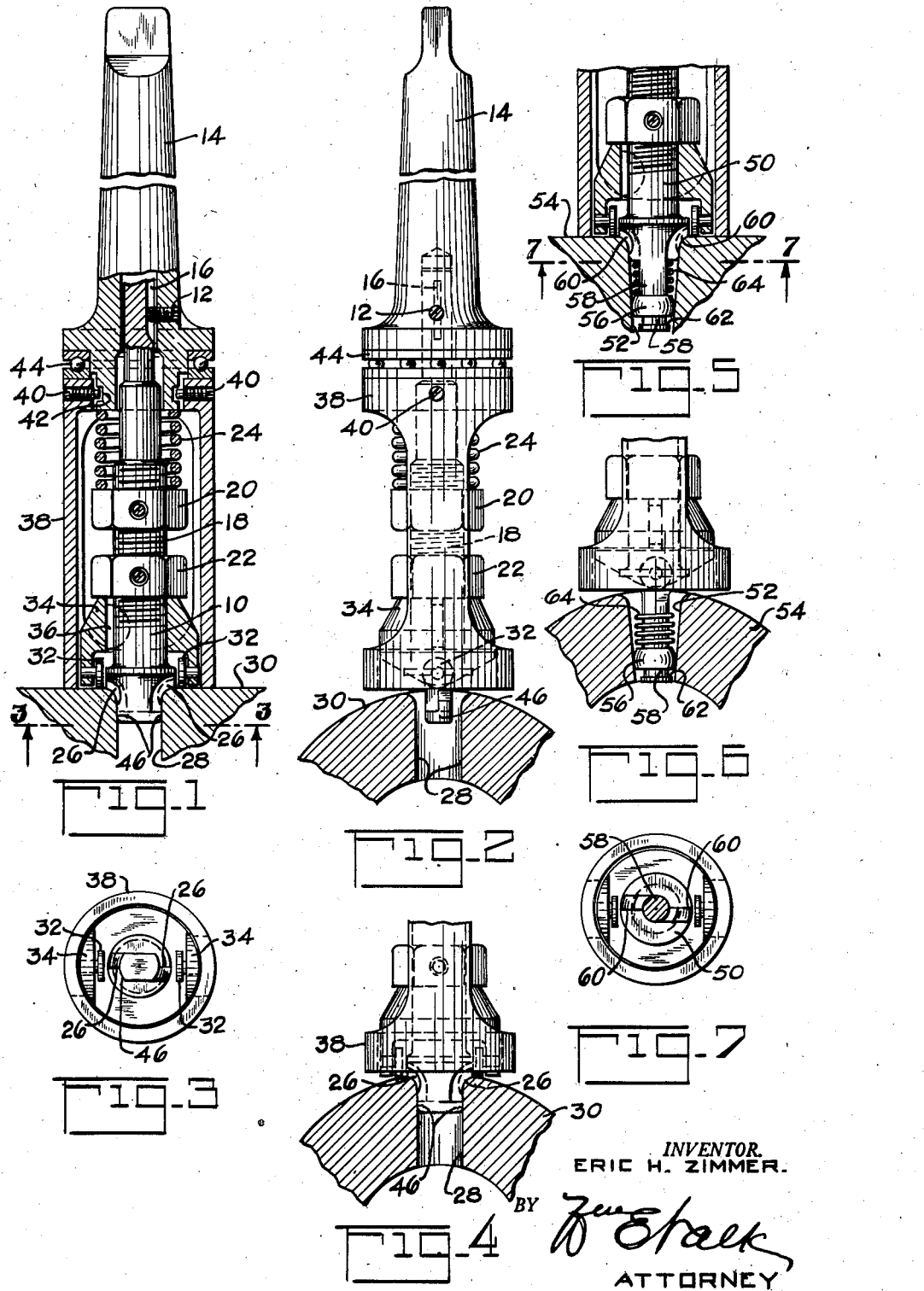
June 17, 1947.  E. H. ZIMMER  2,422,279
RADIUS FORMING TOOL
Filed May 6, 1944
INVENTOR.
ERIC H. ZIMMER.
ATTORNEY Patented June 17, 1947

UNITED STATES PATENT OFFICE 2,422,279

RADIUS FORMING TOOL

Eric H. Zimmer, Wycoff, N. J., assignor to Wright Aeronautical Corporation, a corporation of New York Application May 6, 1944, Serial No. 534,473

14 Claims. (Cl. 77—73.5)

This invention relates to a cutting tool for rounding the entrance edge of a hole, and is particularly directed to a cutting tool for rounding the entrance edge of a hole extending inward from a curved surface.

Prior to the present invention, the entrance edge of a hole extending inward from a curved surface was rounded by a manually manipulated cutting tool. It is an object of this invention to provide a new and improved cutting tool for rounding the entrance edge of such a hole. It is a further object of this invention to provide a tool for this purpose which can be operated from a conventional machine as a drill press. It is a further object of this invention to provide a tool for rounding the entrance edge of a hole in a workpiece in which the tool cutting edge is adapted to be raised and lowered in conformity with the profile of the surface of the workpiece adjacent the tool cutting edge as it rotates around the edge of the hole.

Specifically, the invention comprises a tool in which its cutting edge or edges are spring pressed into engagement with the edge of a hole to be rounded and in which guide means are provided for raising or lowering the cutting tool as it rotates about the axis of the hole in order to provide the same entrance edge curvature around the entire periphery of the entrance edge of the hole.

Other objects of this invention will become apparent upon reading the annexed detailed description in connection with the drawing in which:

Figure 1 is a longitudinal sectional view through the cutting tool;

Figure 2 is a side view of Figure 1;

Figure 3 is a bottom view of the tool as seen along line 3—3 of Figure 1;

Figure 4 is a partial side view similar to Figure 2 but with the tool rotated 90° therefrom relative to the workpiece;

Figure 5 is a sectional view similar to Figure 1 of a modification;

Figure 6 is a side view of Figure 5; and

Figure 7 is a sectional view of the tool along line 7—7 of Figure 5.

Referring first to Figures 1 to 4 of the drawing, a cutting tool 10 is drivably secured by a set screw 12 to a supporting shank 14 which in turn is adapted to be drivably connected to a conventional drill chuck. The set screw 12 projects from the shank 14 into a slot 16 extending axially along the cutter to permit axial movement of the cutter relative to the shank 14. The cutter is provided with threads 18 for receiving adjusting nuts 20 and 22. A spring 24 is disposed between the adjusting nut 20 and the end of the shank 14 for urging the cutter outwardly therefrom. The end of the cutter is provided with a pair of diametrically opposed cutting edges 26 which have a curvature corresponding to the desired curvature of the entrance edge of an opening 28 in a workpiece 30.

A pair of rollers 32 are respectively adapted to be disposed immediately outside one of the cutting edges 26 and are adapted to engage the surface of the workpiece 30 immediately adjacent to the edge of the hole 28 to be rounded. The relative position of the rollers 32 and the cutting edges 26 is best seen in Figure 3. The rollers 32 are pivotly carried by a supporting member 34 slidably keyed to the cutter at 36. The adjusting nut 22 determines the relative axial position of the rollers 32 and the upper edge of the cutting edges 26. As illustrated in the drawing, when the rollers 32 are pressed against the surface of the workpiece 30, their supporting member 34 abuts against the adjustable stop nut 22 to exactly align the work contacting portion of the rollers with the adjacent portion of the cutter edges. Obviously, if desired, a different axial adjustment may be made of the rollers 32 relative to the adjacent cutter edges 26.

With the above described tool construction, when the cutter edges 26 are brought into engagement with an entrance edge of an opening to be rounded, the spring 24 is compressed to maintain the cutter in engagement with the workpiece and the rollers 32 in engagement with the surface of the workpiece about the periphery of an opening 28 therein. Then, as the tool is rotated, the rollers are forced to move axially, in order to follow the surface of the workpiece, whereupon the cutting edges 26 likewise move axially to follow the surface of the workpiece.

As illustrated in the drawing, the workpiece 30 comprises a hollow shaft, as for example, a crank arm of a crank shaft and the opening 28 comprises an oil hole therethrough. In Figures 1 and 2, the two cutting edges 26 of the cutter and their aligned rollers are disposed along the high side of the workpiece about the hole 28, that is, the axis of the rollers 32 is parallel to the axis of the crank arm or workpiece 30. In Figure 4 the cutter has been rotated 90° from its position in Figures 1 and 2, whereupon the rollers 32 are in contact with the low side of the surface of the workpiece about the periphery of the hole 28, and therefore, the cutter edges are correspondingly lowered. Since the spring 24 continually forces the cutting edges 26 and rollers 32 into engagement with the edge of the hole 28 and workpiece respectively, the same final cut will be taken from the edge of the hole 28 around its entire periphery. That is, upon rotation of the cutter, in alignment with the axis of the hole 28, the entire entrance edge of the hole 28 is rounded to the same curvature as the curvature of the cutting edge 26, the member 34 and its rollers 32 acting as a stop determining the desired uniform depth of cut.

In order to prevent the operator from unduly compressing the spring 24 and thereby causing excessive pressure between the tool cutting edges 26 and workpiece 30, a stop sleeve 38 is rotatably carried by the shank 14 by means of set screws 40 extending into an annular groove 42 in the shank 14. With this arrangement, the extent to which the spring 24 can be compressed is determined by the engagement of the end of the sleeve 38 with the surface of the workpiece 30. A roller bearing 44 permits rotation of the shank 14 and its cutter relative to the stop sleeve 38 whereby during cutter operation the sleeve 38 does not rotate over the surface of the workpiece.

The cutting tool of Figures 1 to 4 is also provided with opposed cylindrical surfaces 46 immediately below the cutting edges 26 and fitted to the cylindrical hole 28 in order to center and align the cutting tool therewith. However, if the hole, whose edges are to be rounded is a tapered hole, then the cylindrical guide surfaces 46 would either bind therein or they would fail to engage the walls of the hole. This difficulty is overcome by the modification illustrated in Figures 5 to 7.

The cutting tool of Figures 5 to 7 is identical to that of Figures 1 to 4 except the guide surfaces 46 have been eliminated, and other centering means are provided in order to facilitate alignment of a cutter 50 with a tapered hole 52 extending inward from the cylindrical surface of a workpiece 54. This other centering means comprises a collar 56 slidably supported on a reduced-diameter extension 58 of the cutter below its cutting edges 60. A shoulder 62 on the end of this extension prevents the collar 56 from sliding off the end of the cutter. With this arrangement, when the cutter is inserted within the tapered opening 52, the collar 56 slides down to engage the sides of the tapered opening thereby centering the cutter therein. A spring 64 may also be provided in order to maintain the collar 56 in engagement with the sides of the tapered hole 52. The construction of Figures 5 to 7 is otherwise similar to that of Figures 1 and 4.

From the above description, it is apparent that applicant has provided a cutting tool which may be rotatably driven from a drill press or the like and which is adapted to provide a uniformly curved edge to a hole extending into a workpiece even though the workpiece has a curved surface about the hole. Although as illustrated, the hole whose edge is to be rounded extends radially inward from an external cylindrical surface, a similar cutter could be used for rounding the edge of a hole extending radially from an interior cylindrical surface. Also, the invention obviously is not limited to rounding the edge of a hole extending radially from a cylindrical surface, but is also applicable to a hole inclined to a surface and the surface may be other than cylindrical. However, in these latter applications, it is generally necessary that the cutter have but one cutting edge. In addition it should be obvious that the cutting edges 26 could be straight instead of curved such that the cutter would effect a flat or beveled entrance edge for the holes 28 or 52 instead of the curved entrance edge illustrated. As used in the appendant claims, the word chamfer is intended to cover both such a curved entrance edge and a flat or beveled entrance edge.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A rotary cutting tool for chamfering the entrance edge of a hole extending into a workpiece from a cylindrical surface thereon, said tool comprising a rotatable supporting member, a cutter drivably connected to and axially slidable relative to said supporting member, said cutter having a pair of diametrically opposed cutting edges each similarly curved to the desired curvature of the entrance edge of said hole, stop means rotatable with said cutter and adapted to engage only small areas of the workpiece surface adjacent to each of said cutting edges to limit the depth of the cut, and spring means for axially urging said cutter and stop means toward engagement with said workpiece relative to said supporting member.

2. A rotary cutting tool for chamfering the entrance edge of a hole extending into a workpiece from a cylindrical surface thereon, said tool comprising a rotatable supporting member, a cutter drivably connected to and axially slidable relative to said supporting member, said cutter having a pair of diametrically opposed cutting edges each similarly curved to the desired curvature of the entrance edge of said hole, stop means carried by said cutter, and spring means for axially urging said cutter and stop means toward engagement with said workpiece relative to said supporting member, said stop means comprising a pair of rollers each respectively adapted to engage the surface of the workpiece radially outward from and adjacent one of said cutting edges.

3. A cutting tool comprising a movable supporting member, a cutter member drivably connected to said supporting member and movable relatively thereto, said cutter member having a cutting edge engageable with a nonplanar surface of a workpiece, stop means movable with said cutter member and adapted to engage only a small area of the workpiece surface adjacent to said cutting edge to limit the depth of cut, and resilient means for urging both said cutter member and stop means toward engagement with said workpiece relative to said supporting member.

4. A rotary cutting tool comprising a rotatable supporting member, a cutter member drivably connected to said supporting member and movable axially relatively thereto, said cutter member having a cutting edge engageable with a workpiece, stop means carried by and rotatable with said cutter member and adapted to engage only a small area of the surface of said workpiece adjacent to said cutting edge to limit the depth of the cut, and resilient means for urging both said cutter member and stop means axially toward engagement with said workpiece relative to said supporting member.

5. A rotary cutting tool comprising a rotatable supporting member, a cutter member drivably connected to said supporting member and movable axially relatively thereto, said cutter member having a cutting edge engageable with a workpiece, stop means rotatable with said cutter member, and resilient means adapted to urge both said cutter member and stop means axially toward engagement with said workpiece relative to said supporting member, said stop means having a roller engageable with said workpiece adjacent said cutting edge to limit the depth of cut.

6. A rotary cutting tool for chamfering the edge of a hole extending into a workpiece from a surface thereon, said tool comprising a rotatable supporting member, a cutter drivably connected to and axially slidable relative to said supporting member, said cutter having a cutting edge disposed in a substantially radial plane and shaped to effect said chamfer, stop means rotatable with said cutter and adapted to engage a small area of the workpiece surface substantially radially outwardly from and adjacent to said cutting edge to limit the depth of the cut, and resilient means for axially urging said cutter and stop means toward engagement with said workpiece relative to said supporting member, the arrangement being such that said stop and resilient means are adapted to effect axial movement of said cutting edge relative to said supporting member, in accordance with the profile of said workpiece about said hole, as said cutter rotates about the axis of said hole and is in cutting engagement with the entrance edge of said hole.

7. A rotary cutting tool for chamfering the edge of a hole extending into a workpiece from a surface thereon, said tool comprising a rotatable supporting member, a cutter drivably connected to and axially slidable relative to said supporting member, said cutter having a cutting edge shaped to effect said chamfer, stop means axially slidably keyed to said cutter and adapted to engage only a small area of the workpiece surface adjacent to said cutting edge to limit the depth of the cut, adjustable means on the cutter for determining the axial position of said stop means relative to said cutting edge upon engagement of said stop means with said workpiece surface, and resilient means adapted to axially urge said cutter and stop means into engagement with said workpiece relative to said supporting member.

8. A rotary cutting tool for chamfering the edge of a hole in a workpiece, said tool comprising a rotatable supporting member, a cutter drivably connected to and axially slidable relative to said supporting member, said cutter having a cutting edge shaped to effect said chamfer, stop means rotatable with said cutter and adapted to engage only a small area of the workpiece surface adjacent to said cutting edge to limit the depth of cut, resilient means adapted to axially urge said cutter and stop means toward engagement with said workpiece relative to said supporting member, and second stop means carried by said supporting member to limit the extent to which said resilient means can be strained for urging said cutter into engagement with said workpiece.

9. A tool as recited in claim 8 in which said second stop means comprises a sleeve secured to said supporting member and rotatable relatively thereto.

10. A tool as recited in claim 8 and including means adjustable to determine the extent to which said resilient means is strained when said second stop means engages said workpiece.

11. A rotary cutting tool for chamfering the edge of a hole in a workpiece, said tool comprising a rotatable supporting member, a cutter member drivably connected to said supporting member and movable axially relatively thereto, said cutter member having a cutting edge shaped to effect said chamfer, stop means rotatable with said cutter and adapted to engage only a small area of the workpiece surface to limit the depth of cut, and resilient means adapted to urge both said cutter member and stop member axially toward engagement with said workpiece relative to said supporting member.

12. A rotary cutting tool for chamfering the edge of a hole in a workpiece, said tool comprising a rotatable supporting member, a cutter member drivably connected to said supporting member and movable axially relatively thereto, said cutter member having a cutting edge shaped to effect said chamfer, stop means rotatable with said cutter and adapted to engage only a small area of the workpiece surface adjacent to said cutting edge to limit the depth of cut, and resilient means adapted to urge both said cutter member and stop member axially toward engagement with said workpiece relative to said supporting member.

13. A rotary cutting tool for chamfering the edge of a hole in a workpiece, said tool comprising a rotatable supporting member, a cutter member drivably connected to said supporting member and movable axially relatively thereto, said cutter member having a cutting edge shaped to effect said chamfer, stop means rotatable with said cutter and adapted to engage only a small area of the workpiece surface substantially radially outwardly from and adjacent to said cutting edge to limit the depth of cut, and resilient means adapted to urge both said cutter member and stop member axially toward engagement with said workpiece relative to said supporting member.

14. A rotary cutting tool for chamfering the edge of a hole in a workpiece, said tool comprising a rotatable supporting member, a cutter member drivably connected to said supporting member and movable axially relatively thereto, said cutter member having a cutting edge disposed in a substantially radial plane and shaped to effect the desired chamfer, stop means rotatable with said cutter and adapted to engage only a small area of the workpiece surface substantially radially outwardly from and adjacent to said cutting edge to limit the depth of cut, and resilient means adapted to urge both said cutter member and stop member axially toward engagement with said workpiece relative to said supporting member.

ERIC H. ZIMMER.

REFERENCES CITED

The following references are of record in the file of this patent:

UNITED STATES PATENTS

| Number | Name | Date |
| --- | --- | --- |
| 1,530,593 | Calkins | Mar. 24, 1925 |
| 303,303 | Mansfield | Aug. 12, 1884 |
| 2,192,528 | Schmidt | Mar. 5, 1940 |